United States Patent [19]

Sturza et al.

[11] Patent Number: 4,584,652

[45] Date of Patent: Apr. 22, 1986

[54] APPARATUS AND METHOD FOR DETERMINING IN-PHASE AND QUADRATURE-PHASE COMPONENTS

[75] Inventors: Mark A. Sturza, Woodland Hills; Wayne L. Knitter, Chatsworth; Yi-Zen Wu, Woodland Hills, all of Calif.

[73] Assignee: Litton Systems, Inc., Beverly Hills, Calif.

[21] Appl. No.: 540,035

[22] Filed: Oct. 7, 1983

[51] Int. Cl.⁴ .............................................. G06F 15/20
[52] U.S. Cl. .................................... 364/484; 328/133; 328/155; 324/83 D
[58] Field of Search ........................ 364/481, 484, 575; 307/510, 511, 512; 324/83 R, 83 D, 83 Q; 328/133, 155

[56] References Cited

U.S. PATENT DOCUMENTS

| | | | |
|---|---|---|---|
| 3,956,623 | 5/1976 | Clark et al. | 328/133 |
| 3,971,996 | 7/1976 | Motley et al. | 328/155 |
| 4,061,977 | 12/1977 | Motley et al. | 328/155 |
| 4,178,631 | 12/1979 | Nelson, Jr. | 364/484 |
| 4,246,654 | 1/1981 | Malm | 364/484 |

*Primary Examiner*—Gary Chin
*Attorney, Agent, or Firm*—Elliott N. Kramsky

[57] ABSTRACT

A digital method and a digital processor for determining the in-phase and quadrature-phase components of a phase error of a detected signal. An incoming carrier signal is sampled directly, then combined with estimated phase data (derived in the computer) in the digital processor to derive in-phase and quadrature-phase components of phase error that are provided to the computer for derivation of a subsequent estimate of carrier phase data.

6 Claims, 2 Drawing Figures

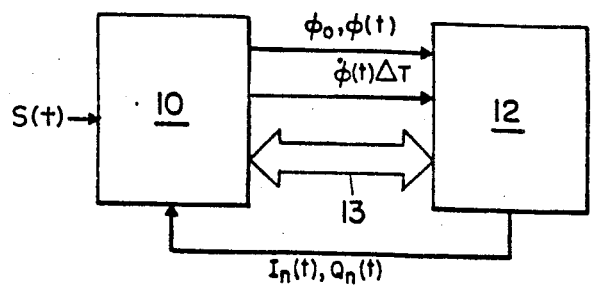
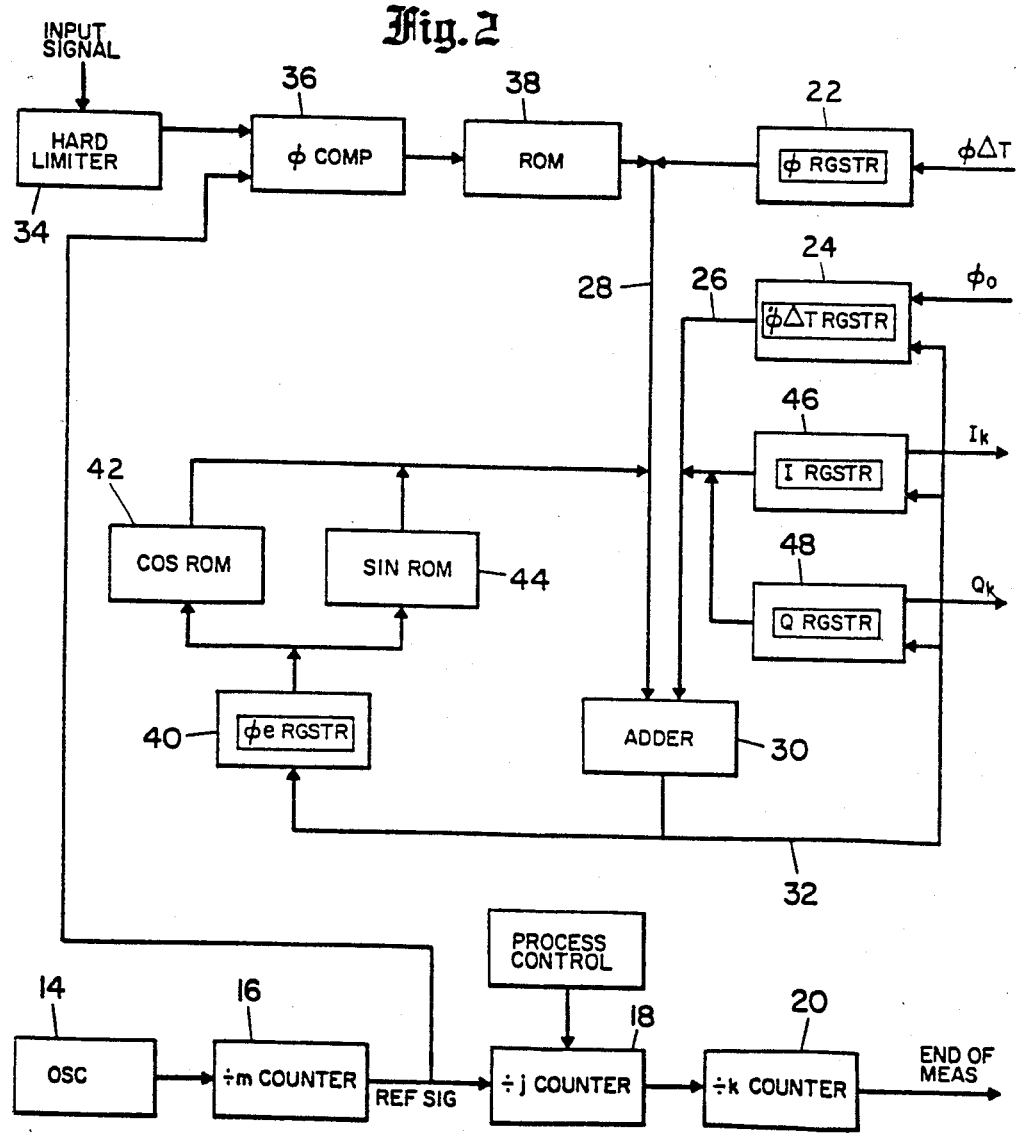

APPARATUS AND METHOD FOR DETERMINING IN-PHASE AND QUADRATURE-PHASE COMPONENTS

BACKGROUND OF THE DISCLOSURE

1. Field of the Invention

The present invention relates to the communications arts. More particularly, this invention pertains to a system and circuitry for tracking the phase of a variable-frequency carrier signal.

2. Description of the Prior Art

In communication, the detection and decoding of transmitted information commonly include, as a necessary receiver function, the tracking of a carrier signal. Often the frequency of the carrier undergoes some variation with time, complicating the information detection process either inadvertently (e.g. though environmental variations such as temperature, etc.) or intentionally (as the result of doppler shift.)

Present-day receiver systems invariably utilize digital computer-aided information processing. Circuits must be utilized in conjunction with such data processing apparatus for tracking the carrier's phase. Often, such circuits provide a precise variable frequency that is derived from an analog signal generated within. Commonly, sine and cosine waveforms are generated that are separately mixed with the detected signal and then filtered to form the in-phase and quadrature phase components of the resulting difference frequency. The in-phase and quadrature phase signals are periodically sampled and converted to digital form for input to the computer that utilizes the information to produce correction signals. The above-described type of circuit commonly includes either a voltage controlled oscillator, voltage controlled crystal oscillator, number controlled oscillator, carrier synthesizer or rate multiplier and incremental phase modulator for generating the sine and cosine waveforms required.

Another common technique involves direct measurement of phase with a phase comparator sampled by the computer. Processing algorithms within the computer replace the sine and cosine generators and other analog circuitry required in the preceding example.

While both of the above mentioned techniques possess certain advantages, the former approach is hampered by a necessity for complex circuitry requiring many discrete components while the latter, although much simpler to implement, is limited by the computational speed of the digital computer which can restrict the sampling rate of the phase comparator.

SUMMARY OF THE INVENTION

The foregoing and additional shortcomings of the prior art are addressed and overcome by the present invention which provides, in a first aspect, a method for determining the in-phase and quadrature-phase components of a phase error of a detected signal. Such digital method includes storing estimates of the initial phase and the phase rate of such detected signal. Thereafter the detected signal is sampled for a predetermined sampling period and the initial estimate of phase of the detected signal is sampled and the phase error for each sample is determined as the difference between such detected signal phase and the updated phase estimate. Then the sine and cosine of the phase error is calculated for each sample and the in-phase component of phase error and the quadrature-phase component of phase error are calculated as the sum of the in-phase component for the previous sample and such sine and cosine values respectively. The in-phase and quadrature components are stored. Thereafter, the stored samples are averaged over the sampling period.

In a further aspect, there is provided a digital processor for calculating the in-phase and quadrature-phase components of a phase error of a detected signal. The processor includes means for storing estimates of the initial phase and the phase rate of the detected signal. Means are provided for sampling the detected signal and for updating the initial estimate of phase as the detected signal is sampled. Means are provided for calculating the difference between the detected phase and the updated phase estimate for each sample taken. Means are further provided for calculating the sine and cosine of each sample and for summing the sine of the phase error and the sine of the phase error of the prior sample to provide an updated in-phase sample. Means are provided for summing the cosine of the phase error with the cosine of the phase error of the prior sample to provide an updated quadrature phase sample. Means are also provided for storing the in-phase and quadrature components of said phase error. Means are additionally provided for averaging the stored in-phase and quadrature-phase components respectively.

The foregoing and additional features and advantages of the invention will become apparent from the following detailed description. In this description of the invention, which is accompanied by a set of drawing figures, corresponding numerals of the written and visual disclosure are provided, like numerals referring to like features of the invention throughout.

BRIEF DESCRIPTION OF THE DRAWINGS

FIG. 1 is a gross block schematic diagram of a phase tracking system in accordance with the invention; and FIG. 2 is a block diagram, at the circuit element level, of a phase tracking system in accordance with the invention.

DETAILED DESCRIPTION

FIG. 1 is a gross block schematic diagram that illustrates the overall system arrangement of the present invention. The system comprises two major elements, a digital computer 10 and a digital processor 12 in communication therewith. While the processor 12 will be disclosed in greater detail in FIG. 2, the essential information flows between the computer 10 and the processor 12 may be seen in FIG. 1 to include estimates of initial phase and phase increment (calculated as estimated phase rate, $\dot{\phi}$, times sampling period $\Delta T$) $\phi_o$, $\dot{\phi}\Delta T$ respectively (computer 10 to processor 12) and in-phase and quadrature-phase components of phase error, $I_n$ and $Q_n$ respectively (processor 12 to computer 10 feedback). System input comprises s(t), the carrier signal that is being tracked. The computer 10 and processor 12 communicate via a two-way timing and control bus 13.

Before proceeding to the detailed circuit arrangement of FIG. 2, a discussion of the theory of operation of the invention is presented infra. Based upon various inputs to the computer, initial phase and phase rate values are derived, $\phi_o$ and $\dot{\phi}$ that, as disclosed, serve as inputs to the processor 12. The processor, upon detection of the carrier or other signal s(t), compares the signal in phase to $\phi_o$, computes the average of both the in-phase and quadrature components of the difference between the measured phase of the carrier and the initial phase estimate $\phi_o$ and transmits these values to the computer for conversion to updated phase and phase rate estimates $\phi(t)$ and $\dot{\phi}(t)$ in accordance with conventional algorithms therefor stored in the computer 10. The process is then repeated, with the new estimates of phase and phase rate being combined with a new sample of the carrier signal s(t) by means of the processor 12 to provide updated values of the in-phase and quadrature components of the difference, or error, between estimated and measured phase.

Mathematically stated, the processor performs following transformations every $\Delta T$ seconds and transmits the resulting values to the computer 10 every $k\Delta T$ seconds:

for n = 1 to k $\phi_n = \phi_{n-1} + \dot{\phi}\Delta T$ $\phi e_n = \phi_n - \phi s_n$ $I_n = I_{n-1} + \cos(\phi e_n)$ $Q_n = Q_{n-1} + \mathrm{SIN}(\phi e_n)$ Where:

$\phi_n$ is the estimated phase for nth sample;

$\dot{\phi}\Delta T$ is the estimate of the phase increment;

$\phi s_n$ is the nth sample of the measured phase of the signal;

$\phi e_n$ is the phase error;

$I_n$ is the average in-phase component of the phase error based on n samples; and $Q_n$ is the average quadrature-phase component of the phase error based on n samples.

FIG. 2 is a detailed schematic diagram of the digital processor 12 for performing the above computations. As is seen, an oscillator 14 produces a pulse train of such frequency that, upon application to divide-by-m counter 16, a reference signal is generated having a frequency that is close to that of the carrier signal intermediate frequency (i.f.).

The reference signal provides certain processor timing processor functions. In the first instance, it is applied to a divide-by-j counter 18 that acts as the circuit's process state counter. Each step of the computations performed by the processor 12 corresponds to one of the j identifiable states of the counter 18. (As will be seen, a single phase measurement is made and processed after j cycles of the derived reference frequency.) The time period between phase measurements (or samples) is designated $\Delta T$ in accordance with the notation of the preceding mathematical expressions.

The output of the divide-by-j counter 18 is applied to a divide-by-k counter 20, the output of the kth stage of which changes state every jxk cycles of the derived reference frequency, a time segment of $k\Delta T$, corresponding to the like value taken from the preceding mathematical expressions. The state of the kth stage of the counter 20 is transmitted to the computer 10 (not shown in FIG. 2), providing an end-of-measurement signal. Upon receipt of the end-of measurement signal form the counter 20, the computer 10 reads the values stored in I and Q registers (to be discussed) and then preloads phase and phase increment input registers (to be discussed) in preparation for the next k-measurement phase sampling-and-error calculation cycle.

An estimate of phase $\phi_n$ is made during each cycle of the processor 12, each cycle being reflected as a change of state of the divide-by-k counter 20. At the beginning of the tracking process, initial estimates of phase and phase increment, $\phi_o$ and $\dot{\phi}\Delta T$, are transmitted from the computer 10 and loaded into a phase register 22 and a phase increment register 24, respectively. The estimate of phase is updated during each computation cycle in accordance with the preceding mathematical expressions by enabling the registers 22 and 24, transferring the updated estimate onto buses 26 and 28 respectively. The values of phase and phase increment are then summed in an adder 30 to provide a new estimate, the updated estimate of phase being conducted to the register 22 by means of a bus 32. This new value is stored in the register 22 for use in the next computation cycle.

The input carrier signal s(t) is sampled by means of a hard limiter 34 at the beginning of each computation cycle. Thereafter, it is compared in phase to the reference signal discussed above. The phase comparison is determined in a comparator 36 as the time difference between the leading edges of the hard limited sample and reference signals (taken by counting a reference clock in the comparator 36) and, after determining the difference, converting it to a number between 0 and m−1, each count of the reference clock representing $2\pi/m$ radians of phase. The output of the comparator 36 is then applied to a rescale read only memory (ROM) 38 wherein the phase difference is negated and normalized to provide the value (from the equations set forth, supra) $-\phi S_n$.

The ROM 38 and estimated phase register 22 are simultaneously enabled during a computation cycle, their contents being thereby transferred to buses 28 and 26 and applied to the input ports of the adder 30 to provide, at the ouput of the adder 30, the phase error value $\phi e_n$. This value is transferred to the phase error register 40 and stored.

ROMs 42 and 44 store cosine and sine tables (in radians), respectively. The value of the phase error, which is stored in the register 40 in radians, is applied to the ROMs 42 and 44 in parallel during each computation cycle. When applied to one of the ROMs the cosine or sine of the angular value is located and latched at the output port of the ROM. Upon application of an appropriately-timed control signal the value stored in the ROM 42 is applied to the adder 30 via bus 28 at the same time the value of the in-phase component of phase error calculated during the previous computation cycle is read out of the I register 46 and applied via the bus 26 to the other input port of the adder 30. These values are combined in the adder and their sum transmitted to the I register for storage. Similarly, the content of the ROM 44 is summed with the previous value of the quadrature component of phase error and this sum stored in the Q register 48. In each instance, the prior value of the appropriate component of the phase error is read out of its corresponding register and into the memory of the computer 10. After k values of the in-phase and quadrature-phase components of phase error have been computed by the processor 12, each component is summed, then divided by k to produce an averaged value thereof that the computer 10 then processes to derive updated estimates of phase and phase rate (and phase increment) for the next computation cycle. Simultaneously, the I and Q registers are reset to zero in preparation for the next k computations. Timing and control signals transferred between the computer 10 and the processor 12 over the bus 13 act, inter alia, to regulate the signal transmission sequences over the shared conductors or buses of the processor 12.

Thus it is seen that there has been brought to the communications art new and improved apparatus and method for tracking a signal. By incorporating the teachings of the invention into a receiver one may overcome the aforementioned disadvantages of the prior art. In addition, by employing a direct phase sampling mechanism and technique and by incorporating a special purpose digital processor in addition to the system digital computer, one may achieve the advantages inherent in a system in which a processor performs a number of computations that would otherwise be performed by the digital computer. These advantages include the fast computations that are made possible by the tailoring of the architecture of the processor to the specific computations required. As a result, a higher phase sampling rate is obtained than would otherwise be possible in a direct sampling technique. Further, in accordance with the invention, an estimated phase rate is computed, allowing carrier signals to be tracked that have large frequency uncertainties. Finally, the circuit disclosed is all digital, making it ideal for incorporation into a custom integrated circuit.

While the invention has been disclosed in accordance with its presently preferred embodiment, it is not intended to be so limited in its scope. Rather, the invention is only bounded as defined by the following set of claims and their equivalents.

What is claimed is:

1. A digital method for determining the in-phase and quadrature-phase components of a phase error of a detected signal comprising the steps of:
    (a) storing estimates of the initial phase and the phase rate of said detected signal; then
    (b) sampling said detected signal for a predetermined sampling period; and
    (c) updating said initial estimate of phase as said detected signal is sampled; and
    (d) determining a phase error for each sample as the difference between said detected signal phase and said updated phase estimate; and
    (e) calculating the sine and cosine of said phase error for each sample; and
    (f) calculating the in-phase component of said phase error for each sample as the sum of the in-phase component for the previous sample and said sine value; and
    (g) calculating the quadrature-phase component of said phase error for each sample as the sum of the quadrature-phase component for the previous sample and said cosine value; and
    (h) storing said in-phase and quadrature components of said phase error; then
    (i) averaging the stored in-phase components of phase error over said sampling period; and
    (j) averaging the stored quadrature-phase components of phase error over said sampling period.

2. A digital method as defined in claim 1 wherein the step of updating said estimate of phase as said signal is sampled comprises the additional steps of:
    (a) multiplying the time between samples by said estimate of phase rate; then
    (b) adding (a) to the prior sample phase estimate.

3. A digital method as defined in claim 2 wherein the step of storing said in-phase and quadrature-phase components including the step of storing said in-phase and quadrature-phase components of samples thereof in digital registers.

4. A digital method as defined in claim 3 wherein the step of calculating the sine and cosine of phase error for each sample includes the step of storing sine and cosine data in read only memories.

5. A digital processor for calculating the in-phase and quadrature-phase components of a phase error of a detected signal comprising, in combination:
    (a) means for storing estimates of the initial phase and, the phase rate of said detected signal;
    (b) means for sampling said detected signal;
    (c) means for updating said initial estimate of phase as said detected signal is sampled;
    (d) means for determining said phase error as the difference between said detected phase and said updated phase estimate for each sample thereof;
    (e) means for calculating the sine and cosine of phase error for each sample;
    (f) means of summing the sine of said phase error with the sine of said phase error of the prior sample to provide an updated in-phase sample;
    (g) means for summing the cosine of said phase error with the cosine of phase error of the prior sample to provide an updated quadrature phase sample;
    (h) means for storing the in-phase and quadrature components of said phase error;
    (i) means for averaging the stored in-phase components of said phase error as the average value thereof over a predetermined sampling period; and
    (j) means for averaging the stored quadrature phase component of the phase errors as the average value thereof over said sampling period.

6. A digital processor as defined in claim 5 wherein said means for calculating the sine and cosine of said phase error comprises at least one read only memory for storing data used for calculating the sine and cosine of said phase error.

* * * * *